United States Patent [19]

Ishikawa

[11] Patent Number: 5,379,660
[45] Date of Patent: Jan. 10, 1995

[54] FEED SCREW MECHANISM PROVIDED WITH VIBRATION DAMPING MEANS

[75] Inventor: Akihiko Ishikawa, Maebashi, Japan
[73] Assignee: NSK Ltd., Tokyo, Japan
[21] Appl. No.: 21,015
[22] Filed: Feb. 22, 1993

[30] Foreign Application Priority Data

Feb. 26, 1992 [JP] Japan .................. 4-039591

[51] Int. Cl.⁶ .................. F16H 25/20; F16F 15/10
[52] U.S. Cl. .................. 74/89.15; 74/574; 188/378; 464/180
[58] Field of Search .............. 74/424.8 R, 89.17, 574; 188/378; 464/180

[56] References Cited

U.S. PATENT DOCUMENTS

| | | | |
|---|---|---|---|
| 2,195,041 | 3/1940 | Schlippe | 188/378 X |
| 3,756,351 | 9/1973 | Sasaki | 188/378 |
| 4,030,137 | 6/1977 | Daiziel | 74/574 X |
| 4,483,523 | 11/1984 | Bredow | 269/60 |
| 4,671,127 | 6/1987 | Yamaguchi et al. | 74/89 |

FOREIGN PATENT DOCUMENTS 3139031  3/1983  Germany .

*Primary Examiner*—Allan D. Herrmann
*Attorney, Agent, or Firm*—Shapiro and Shapiro

[57] ABSTRACT

A feed screw mechanism includes a cantilever type feed screw shaft having a support end rotatably supported on a base, and a nut screwed on the feed screw shaft and secured to a moving member guidingly movable relative to the base. According to one feature of the present invention, a vibration damping mechanism includes a ring member mounted on the free end part of the feed screw shaft, and a recessed portion such as groove is formed on the inner circumferential surface of the ring member and/or the outer circumferential surface of the feed screw shaft. According to another feature of the present invention, a disk-like flange portion is provided at the free end part of the feed screw shaft as a part of the vibration damping mechanism for the feed screw mechanism.

7 Claims, 6 Drawing Sheets

FEED SCREW MECHANISM PROVIDED WITH VIBRATION DAMPING MEANS

BACKGROUND OF THE INVENTION

1. Field of the Invention

The present invention relates to improvement of the feed screw mechanism comprising a feed screw shaft of a cantilever type having a free end, a nut screwed on the shaft and a vibration damping member mounted on the screw shaft.

2. Related Background Art

As the vibration damping means for the cantilever type having a free end feed screw mechanism, there has been conventionally used a ring member or a bearing. For example, the invention utilizing the ring member or the bearing had been already proposed in U.S. Pat. No. 4,671,127. The cited reference discloses regarding that in a case the vibration damping means is a ring member, the inner diameter of the vibration damping member is so determined as to be slightly larger than the outer diameter of the portion of the screw shaft on which the vibration damping member is mounted.

When such a ring member is used as a vibration damping means therein, the clearance between the outer diametric circumferential surface of the mounting portion of the shaft and the inner diametric circumferential surface of the ring member allows the ring member to move therein. This collision between the ring member and the mounting portion of the shaft produces a damping effect against the radial vibration of the feed screw shaft. On the other hand, in a case where the vibration damping means is a bearing, a damping effect is produced by the collision between inner race and balls and also between outer race and balls to damp the radial vibration of the feed screw shaft.

An example of such cantilever type feed screw mechanism according to the prior art will be described in detail with reference to FIG. 15 of the accompanying drawings.

Referring to FIG. 15, the base 1 has an upright part 2 in which one end of a feed screw shaft 4 is rotatably supported by way of a bearing 3. A portion of the one end (support end) of the screw shaft 4 projects from the upright portion 2 of the base. A belt pulley 5 is fixed on the projected portion of the screw shaft.

A ball nut 6 is screwed onto the middle portion of the feed screw shaft 4 so that the thread groove formed on the inner circumferential surface of the ball nut 6 cooperates with the ball thread groove 7 formed on the outer circumferential surface of the feed screw shaft by way of balls. The ball nut 6 is fixed to a slide table 8 of a moving member.

The free end of the feed screw shaft 4 is provided with a mounting portion 9 having a smaller diameter. A ring member 10 is mounted as vibration damping means thereon.

The ring member 10 is mounted on the mounting portion 9 by making the mounting portion pass through a through hole 11 of the ring member to hold it on the mounting portion 9 by a stop ring 12. The inner diameter of the through hole 11 is so measured as to be slightly larger than the outer diameter of the mounting portion 9, thereby providing some clearance therebetween. In addition, the distance from the stepped portion 13 of the shaft to the stop ring 12 is formed larger than the width of the ring member 10.

In the prior art, the ring member 10 mounted on the free end of the feed screw shaft 4 is allowed to move in the radial direction of a screw feed shaft 4 within the range determined by the clearance between the mounting portion 9 and the ring member 10. Therefore, when vibration is applied to the feed screw shaft, a damping effect is produced by the collision between the mounting portion 9 and the ring member 10. By the damping effect, the radial vibration of the feed screw shaft 4 and the noise generation by such vibration are restrained.

However, the above prior art mechanism involves the problem that lubricant such as oil or grease inevitably flowing along the outer circumferential surface of the feed screw shaft 4 penetrates into the clearance formed between the inner surface of the through hole 11 of the ring member 10 and the outer surface of the mounting portion 9. When such penetration of lubricant occurs, the collision between the mounting portion 9 and the ring member 10 brings about unnecessary buffered state by the viscosity of the lubricant.

As the result, the damping effect by the collision is reduced to a great extent as compared to the damping effect obtained when no lubricant is present in the clearance. Thus, the ability of the ring member for damping the vibration of the feed screw shaft 4 is decreased.

In order to solve the problem, it may be proposed to increase the clearance between the inner surface of the ring member 10 and the mounting portion 9 of the feed screw shaft. However, this solution brings about another problem that the noise generated by the collision is increased and also the damping effect obtained by the collision is reduced.

SUMMARY OF THE INVENTION

Accordingly, the object of the present invention is to provide a feed screw mechanism provided with vibration damping means which enables to minimize the above problems and to prevent the decrease of the damping effect as caused by the penetration of lubricant into the clearance.

According to a first aspect of the invention of the present application, there is thus provided a feed screw mechanism comprising:

a cantilever free-end type feed screw shaft having a support end rotatably supported on a base;

a nut screwed on the feed screw shaft and secured to a moving member guidingly movable relative to the base;

a vibration damping member loosely fitted on a mounting portion provided at the free end of said feed screw shaft; and means for allowing lubricating oil which penetrates into a space formed by said vibration damping member and said free end of said feed screw to escape from said space.

According to a second aspect of the invention, there is provided a feed screw mechanism comprising:

a cantilever free-end type feed screw shaft having a support end rotatably supported on a base;

a nut screwed on the feed screw shaft and secured to a moving member guidingly movable relative to the base;

a vibration damping member loosely fitted on a mounting portion provided at the free end of said feed screw shaft; and means for preventing lubricating oil from penetrating from outside into a space between said vibration damping member and said free end of said feed screw shaft.

In accordance with a preferred implementation according to the first aspect of the invention, a recessed portion for allowing lubricating oil penetrating from outside to escape therefrom is provided as a groove cut out rotating around a rotation axis along said one or both surfaces.

In the feed screw mechanism provided with vibration damping means according to the first aspect of invention, even when any lubricant penetrates into a space between the two abutting surfaces of the mounting portion formed by the feed screw shaft and the vibration damping member, the lubricating naturally flows into the recessed so that there scarcely forms an oil film on the abutting surfaces.

In the feed screw mechanism according to the second aspect of the invention described above, the flange or the projected portion, by shaping a portion of said free end of the screw shaft, has an effect to prevent any external lubricant from penetrating into the space between the two abutting surfaces. Thus, the flange additionally provided according to the invention serves as means for damming up the external lubricating oil which otherwise may flow into the space between the abutting surfaces.

Additionally, in the feed screw mechanism according to the first aspect of the invention described above, the recessed portion for escaping lubricating oil can easily be formed by using a centerless grinding machine or the like.

As described above, it is possible to prevent the lowering of the vibration damping efficiency as caused by the penetration of lubricant or the like into the clearance between the abutting surfaces of the mounting portion of the feed screw shaft and the vibration damping member. Further, it is possible to stabilize the ability of the vibration damping member by preventing the penetration of the lubricant and the like into the clearance between the abutting surfaces. Other features and advantages of the present invention will be apparent from the following description taken in connection with the accompanying drawings.

DETAILED DESCRIPTION OF THE PREFERRED EMBODIMENTS

Preferred embodiments of the present invention will be described with reference to FIGS. 1 to 6. In these figures, only the vibration damping member is shown. Other parts correspond to those of the prior art mechanism previously described with reference to FIG. 15 in function and structure and, therefore, they are not further shown and described.

Figure 1:
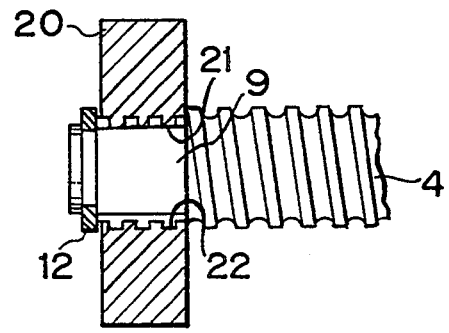
FIG. 1 is a longitudinal sectional view of an embodiment of the present invention.

In the first embodiment shown in FIG. 1, a spiral groove 22 is formed on the inner circumferential surface 21 of the through hole of the ring member 20. The spiral groove 22 serves as a lubricant relief to provide a lubricant receiving portion 22 while substantially keeping the inner diameter of the ring member 20 at the same size as that of the prior art one.

Since there is obtained substantially the same volume of clearance as used in the prior art between the inner circumferential surface of the ring member 20 and the outer circumferential surface of the mounting portion 9, this embodiment exhibits the same degree of the vibration damping effect as the prior art one does when no penetrated lubricant is present in the clearance. Even if any lubricant penetrates into the clearance, the vibration damping means of this embodiment can perform its function in stable manner.

It will be understood that the same effect can be obtained when a spiral groove is formed on the feed screw shaft surface instead of the ring member surface.

The vibration damping effect obtained by the above embodiment of the present invention is explained hereinafter with experimental data comparing with the prior art.

Figure 15:
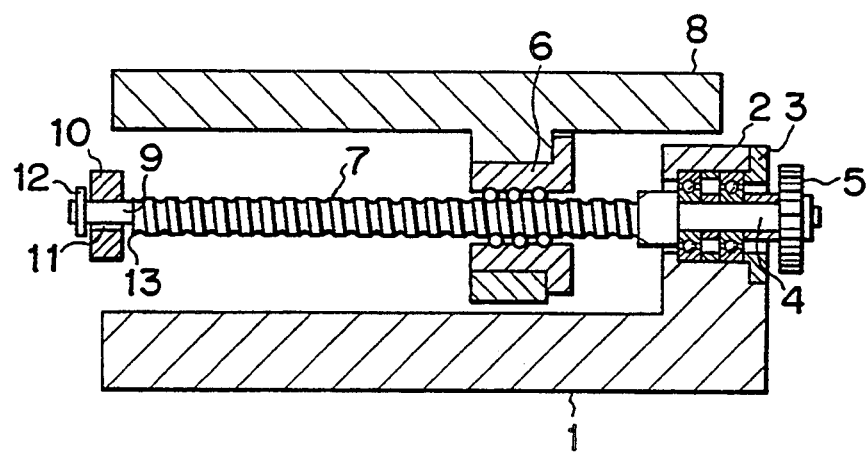
FIG. 15 is a longitudinal sectional view of the feed screw mechanism of the prior art.

FIGS. 7 through 10 are graphs showing experimental data of the prior art feed screw mechanism shown in FIG. 15. In the experiment, the feed screw shaft 4 is vibrated by applying a radial impact onto the free end of the shaft and the radial response of the free end is plotted as a wave form relative to time as shown in FIGS. 7 to 10.

Figure 7:
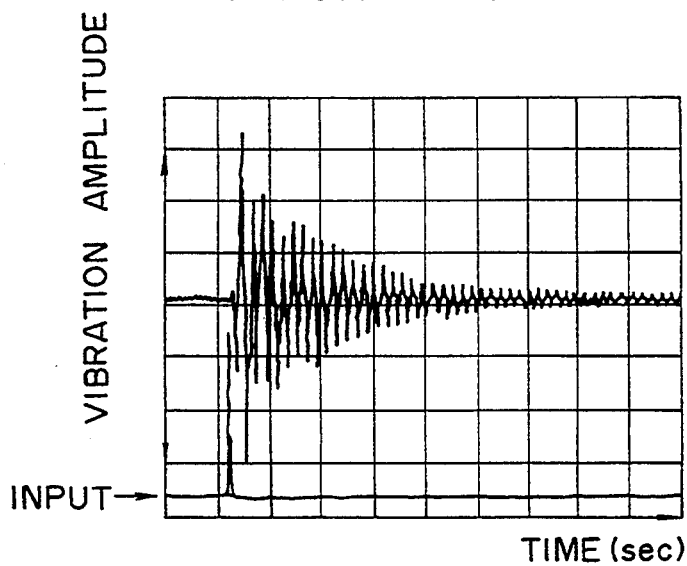
FIG. 7 is a graph showing the radial vibration amplitude (wave form relative to time) of the prior art feed screw shaft as one piece member (without vibration damping ring) as obtained when the shaft is vibrated by the application of radial impact thereto.

FIG. 7 is a graph showing the response of the feed screw shaft as one piece member, that is, of the feed screw shaft without vibration damping means, namely the ring member 10.

Figure 8:
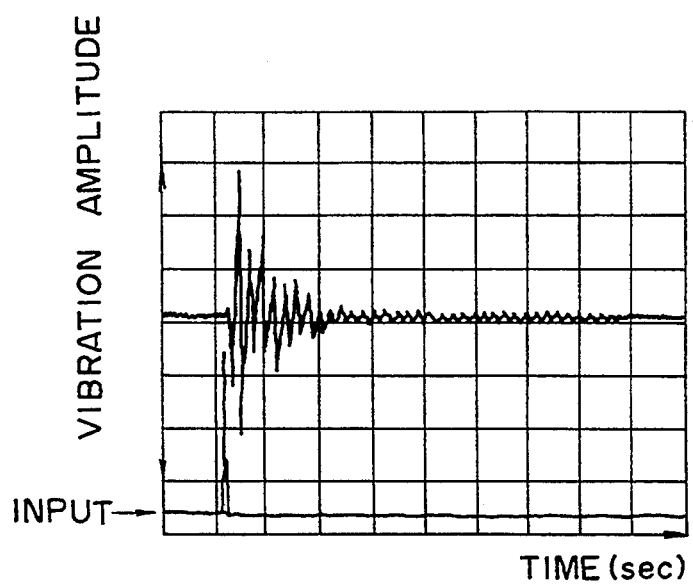
FIG. 8 is a graph showing the radial vibration amplitude (wave form relative to time) of the prior art feed screw shaft (provided with a vibration damping ring) as obtained when the shaft is vibrated by the application of radial impact thereto.

FIG. 8 is the graph showing the response of the feed screw shaft with the ring member 10 according to the prior art as shown in FIG. 15. As seen from FIG. 8, owing to the effect of the vibration damping means, in this case, the vibration amplitude is damped down quickly to approach zero in a very short time.

Figure 9:
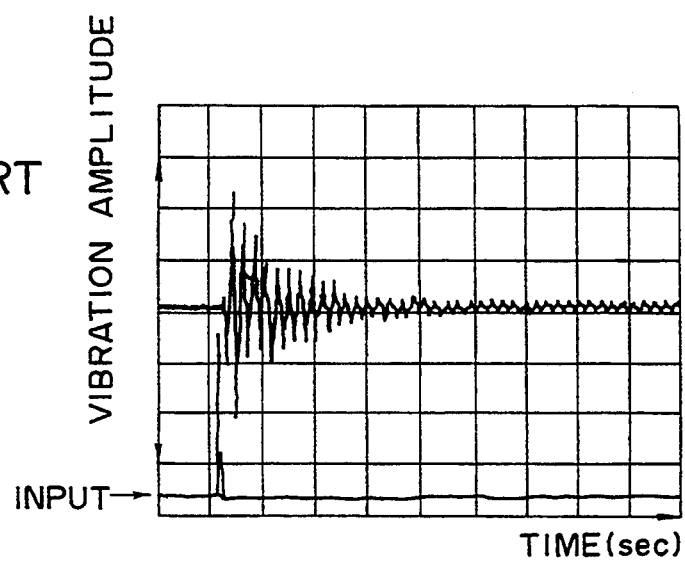
FIG. 9 is a graph showing the radial vibration amplitude (wave form relative to time) of the prior art feed screw shaft (provided with a vibration damping ring) as obtained when the shaft is vibrated by the application of radial impact thereto.

FIG. 9 was obtained when the prior art mechanism was used under the condition that some lubricating oil was intentionally penetrated into the clearance between the ring member 10 and the small-diametered mounting portion 9 at the free end of the feed screw shaft 4. In this case, as seen from FIG. 9, the time required for the vibration amplitude to damp down to zero was longer than that of FIG. 8 because of the lubricant existing between the ring member and the mounting portion.

Figure 10:
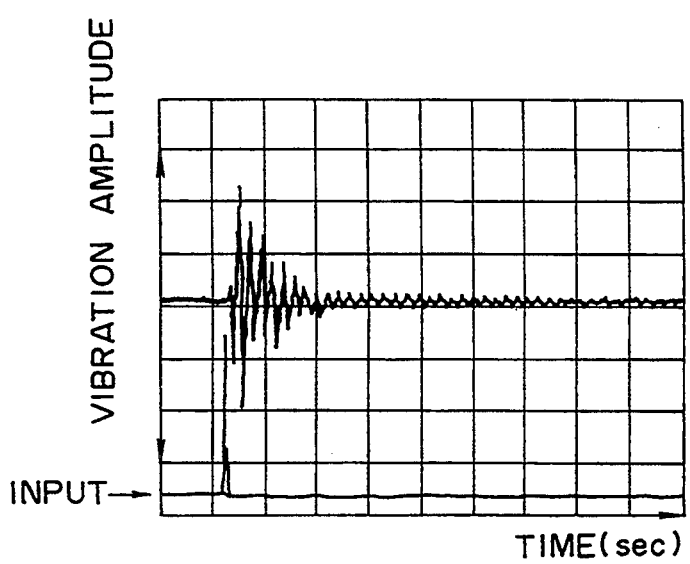
FIG. 10 is a graph showing the radial vibration amplitude (wave form relative to time) of the feed screw shaft according to an embodiment of the present invention as obtained when the shaft is vibrated by the application of radial impact thereto.
Figure 11:
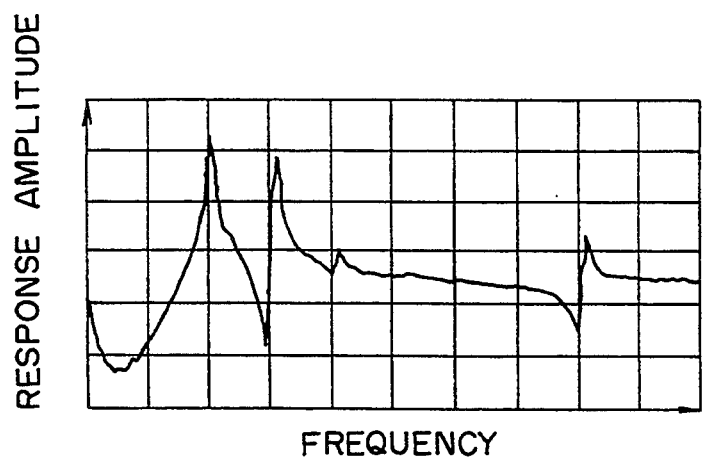
FIG. 11 is a graph showing the transfer function of the prior art feed screw shaft as one piece member as obtained when the shaft without vibration damping ring is vibrated by the application of radial impact thereto.
Figure 12:
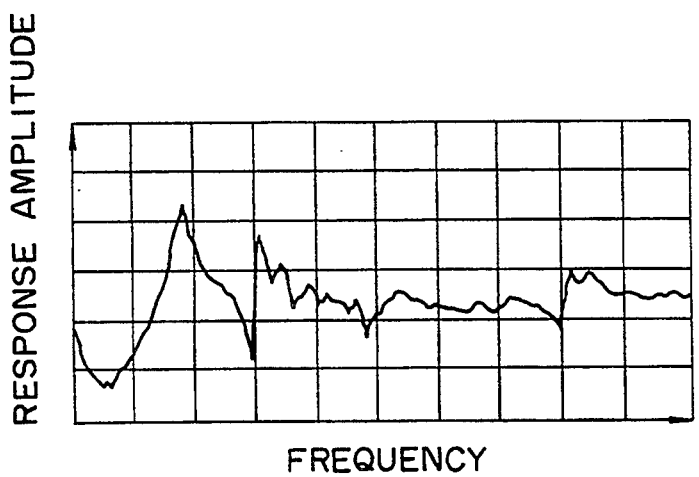
FIG. 12 is a graph showing the transfer function of the prior art feed screw shaft with vibration damping ring as obtained when the shaft is vibrated by the application of radial impact thereto.

However, comparing FIG. 9 with FIG. 10, one can clearly see the difference in damping time therebetween. FIG. 10 is a graph showing the response curve of the feed screw mechanism according to the present invention. The feed screw shaft used for this experiment was provided with the ring member 10 having a spiral groove 22 formed on the inner circumferential surface 21 of the through hole as shown in FIG. 1. For the experiment, similarly to the case of FIG. 9, some lubricating oil was intentionally penetrated into the clearance between the ring member 20 and the small-diametered mounting portion 9 at the free end of the feed screw shaft 4. The graph of FIG. 10 shows that the vibration damping time of the embodiment of the present invention was remarkably shorter than that of the prior art one shown in FIG. 9.

The effect of the present invention is explained also by FIGS. 11 to 14 obtained using another measuring method.

Specifically, the free end of the feed screw shaft 4 was brought into vibration by applying a radial impact thereto. The response frequency thereof was plotted on abscissa and the radial response amplitude was plotted on ordinate to show a transfer function. FIGS. 11 to 14 show the transfer functions obtained under different conditions. The conditions under which the graphs of FIGS. 11, 12, 13 and 14 were obtained correspond to those previously described for the graphs of FIGS. 7, 8, 9 and 10 respectively.

Figure 13:
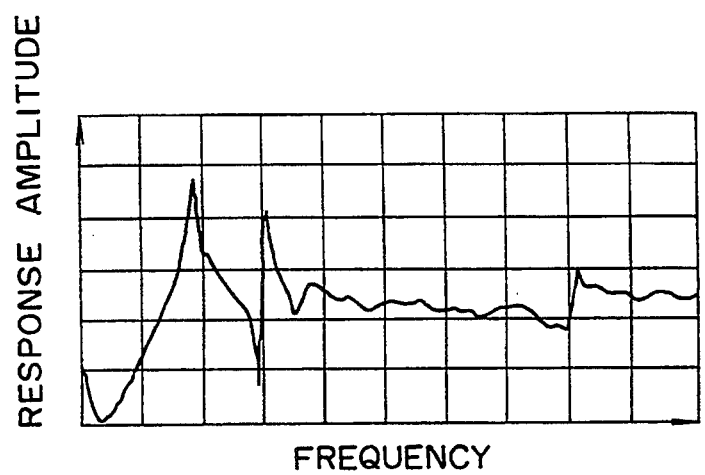
FIG. 13 is a graph showing the transfer function of the prior art feed-screw shaft with vibration damping ring as obtained when the shaft is vibrated by the application of radial impact thereto.
Figure 14:
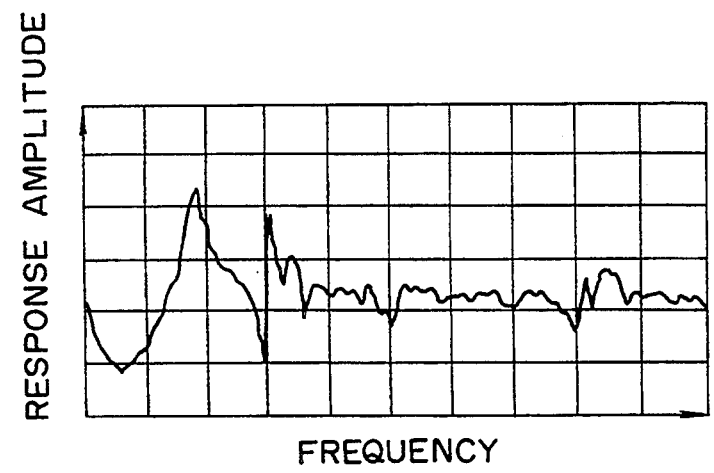
FIG. 14 is a graph showing the transfer function of the feed screw shaft according to the present invention as obtained when the shaft is vibrated by the application of radial impact thereto.

Comparing these graphes with each other, it will be understood that the peak of the response amplitude for the prior art feed screw shaft 4 only (FIG. 11) can be decreased by mounting on the shaft the ring member 10 as a vibration damping means (FIG. 12), but the vibration damping effect of a prior art vibration damping means is reduced by the penetration of lubricating oil into the mounting portion so that the peak value is again increased (FIG. 13). On the contrary, when the ring member 20 according to the invention is used, there is obtained always stable vibration damping effect irrespective of whether or not any lubricant is present between the clearance between the ring member and the mounting portion and, therefore, the peak of response amplitude is kept within a lower level (FIG. 14).

Hereinafter, other embodiments of the present invention will be described with reference to FIGS. 2 through 6.

Figure 2:
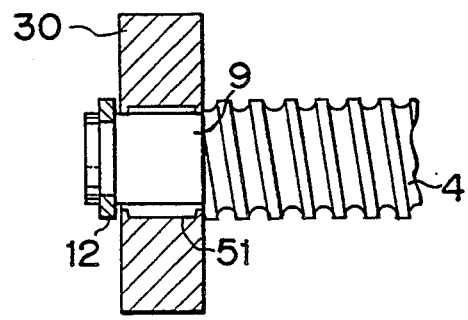
FIG. 2 is a longitudinal sectional view of a modification of the embodiment of the present invention.

FIG. 2 shows a modification of the first embodiment shown in FIG. 1. In this modification, a ring groove 51 is formed at the axially middle part on the inner circumferential surface of the ring member 30. The ring groove 51 (lubricant relief) has the same effect as the spiral groove 22 of the first embodiment. It is to be understood that the same effect can be obtained also by forming a similar ring groove on the feed screw shaft surface.

Figure 3A:
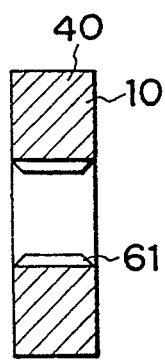
FIG. 3A is a sectional view of a part of another embodiment of the present invention.
Figure 3B:
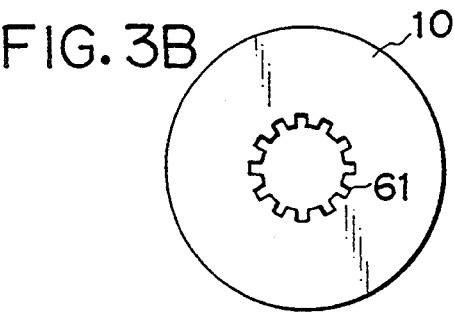
FIG. 3B is a front view of the part of the same embodiment as shown in FIG. 3A.

FIGS. 3A and 3B show another embodiment of the present invention. In this embodiment, axial grooves 61 (lubricant relief) are formed in the inner circumferential surface of the ring member 40. The function and effect of this embodiment are essentially the same as that of the previous embodiments.

Figure 4:
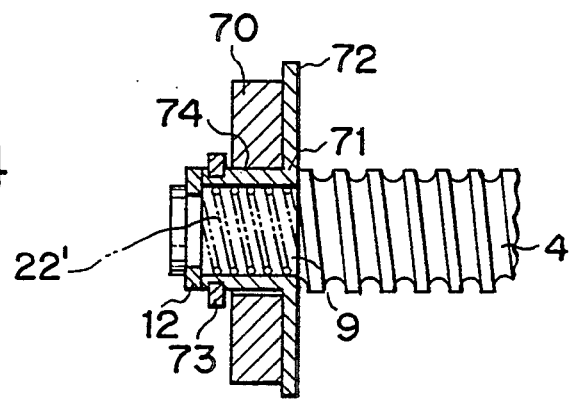
FIG. 4 is a sectional view of a further embodiment of the present invention.

FIG. 4 shows still a further embodiment of the present invention. In this embodiment, a restraining member 71 is tightly (with no clearance) fitted onto the ring mounting portion 9 of the feed screw shaft 4. The restraining member 71 having an L-shape section comprises a cylindrical portion 74 and a flange portion 72. After fitting, there is left no clearance between the mounting portion 9 and the restraining member 71. A ring member 70 is loose-fitted on the cylindrical portion 74 of the restraining member 71 with a clearance being left between the outer circumferential surface of the cylindrical portion 74 and the inner circumferential surface of the ring member 70. To prevent the ring member 70 from slipping off the cylindrical portion 74, a stop ring 73 is provided on the cylindrical portion.

In the embodiment shown in FIG. 4, the flange 72 of the restraining member 71 has the effect to prevent any lubricant from flowing into the clearance between the cylindrical portion 74 and the ring member 70 along the feed screw shaft 4, thereby preventing the reduction of the vibration damping effect.

In order to bring about a better effect, a thread groove as shown in the first embodiment may additionally be provided as lubricant relief as indicated phantom at 22' in FIG. 4.

Figure 5:
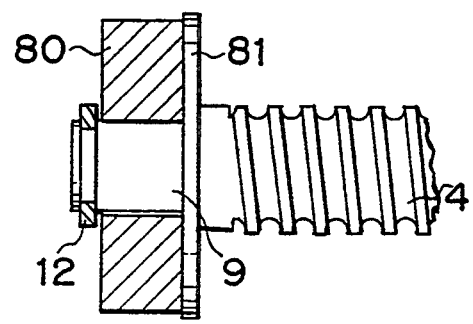
FIG. 5 is a sectional view of still a further embodiment of the present invention.

FIG. 5 is a further embodiment of the present invention. In this embodiment, a flange portion 81 is integrally formed with the feed screw shaft 4 at the root position of the ring-mounting portion 9 thereof. The flange 81 has the effect to prevent any lubricating oil from flowing into the clearance between the ring member 80 and the mounting portion 9 along the feed screw shaft 4.

Figure 6:
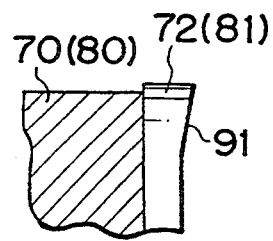
FIG. 6 is a partial sectional view of a modification of the embodiment of the present invention.

FIG. 6 shows a modification of the embodiments shown in FIGS. 4 and 5. In this modification, the flange 72 or 81 has an inclined side surface 91. The inclination of the side surface 91 is so determined as to guide the lubricating oil or the like to the direction away from the ring-mounting portion 9. By this modification, the penetration of lubricating oil into the mounting portion can be prevented more effectively.

In the embodiments shown in FIGS. 5 and 6, the outer diameter of the flange was so measured as to be larger than the outer diameter of the ring member 80 functioning as vibration damping means.

What is claimed is:

1. A feed screw mechanism comprising:
   a cantilever free-end type feed screw shaft having a support end rotatably supported on a base;

a nut screwed on the feed screw shaft and secured to a moving member guidingly movable relative to the base;

a vibration damping member loosely fitted on a mounting portion provided at the free end of said feed screw shaft; and means for allowing lubricating oil which penetrates into a space formed by said vibration damping member and said free end of said feed screw to escape from said space, said means including a recessed portion formed on an inner circumferential surface of said vibration damping member.

2. A feed screw mechanism according to claim 1, wherein said recessed portion includes a groove cut out rotating around a rotation axis along an inner circumferential surface of said vibration damping member.

3. A feed screw mechanism comprising:

a cantilever free-end type feed screw shaft having a support end rotatably supported on a base;

a nut screwed on the feed screw shaft and secured to a moving member guidingly movable relative to the base;

a vibration damping member loosely fitted on a mounting portion provided at the free end of said feed screw shaft; and means for allowing lubricating oil which penetrates into a space formed by said vibration damping member and said free end of said feed screw to escape from said space, said means including a recessed portion formed on an outer circumferential surface of said free end of said feed screw shaft.

4. A feed screw mechanism according to claim 3, wherein said recessed portion includes a groove cut out rotating around a rotation axis along an outer circumferential surface of said free end of said feed screw shaft.

5. A feed screw mechanism comprising:

a cantilever free-end type feed screw shaft having a support end rotatably supported on a base;

a nut screwed on the feed screw shaft and secured to a moving member guidingly movable relative to the base;

a vibration damping member loosely fitted on a mounting portion provided at the free end of said feed screw shaft; and means for preventing lubricating oil from penetrating from outside into a space between said vibration damping member and said free end of said feed screw shaft.

6. A feed screw mechanism according to claim 5, wherein said means includes a flange member provided at said free end of the screw shaft, and said vibration damping member is provided at the free end side of the feed screw shaft as viewed from said flange member.

7. A feed screw mechanism according to claim 5, wherein said means includes a flange portion formed integrally with said screw shaft at said free end of the screw shaft, and said vibration damping member is provided at the free end side of the feed screw shaft as viewed from said flange portion.

* * * * *